United States Patent
Chan et al.

(10) Patent No.: US 9,544,358 B2
(45) Date of Patent: Jan. 10, 2017

(54) PROVIDING NEAR REAL-TIME DEVICE REPRESENTATION TO APPLICATIONS AND SERVICES

(71) Applicant: QUALCOMM Technologies, Inc., San Diego, CA (US)

(72) Inventors: Adrian Chan, Sunnyvale, CA (US); Chun Qing Liang, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 14/165,157

(22) Filed: Jan. 27, 2014

(65) Prior Publication Data

US 2014/0244789 A1    Aug. 28, 2014

Related U.S. Application Data

(60) Provisional application No. 61/756,727, filed on Jan. 25, 2013, provisional application No. 61/756,748, filed on Jan. 25, 2013, provisional application No. 61/756,785, filed on Jan. 25, 2013, provisional application No. 61/798,347, filed on Mar. 15, 2013, provisional application No. 61/794,977, filed on Mar. 15, 2013.

(51) Int. Cl.
*G06F 15/173* (2006.01)
*H04L 29/08* (2006.01)
*H04L 29/06* (2006.01)

(52) U.S. Cl.
CPC .............. *H04L 67/10* (2013.01); *H04L 63/08* (2013.01); *H04L 67/141* (2013.01); *H04L 67/14* (2013.01)

(58) Field of Classification Search
CPC ........ H04L 67/10; H04L 67/141; H04L 67/14; H04L 63/08
USPC ........................................................ 709/224
See application file for complete search history.

(56) References Cited

U.S. PATENT DOCUMENTS

| | | | |
|---|---|---|---|
| 7,992,002 B2 | 8/2011 | Bradbury | |
| 8,015,114 B1 | 9/2011 | Nachenberg | |
| 8,234,408 B2 | 7/2012 | Jungck | |
| 8,316,135 B2 | 11/2012 | Ford | |
| 8,495,618 B1 | 7/2013 | Inbaraj et al. | |

(Continued)

OTHER PUBLICATIONS

International Search Report and Written Opinion—PCT/US2014/013212—ISA/EPO—Aug. 15, 2014.

(Continued)

*Primary Examiner* — Karen Tang
(74) *Attorney, Agent, or Firm* — Paradice and Li LLP

(57) ABSTRACT

Systems and methods are described comprising receiving at a platform device data of a client device and storing the device data in a data block allocated to the client device. A control command for the client device is received from a service application, and the control command is accepted at a device controller. The device controller accepts the control command on behalf of the client device. The device controller, in response to the control command, retrieves the device data from the data block instead of receiving the device data directly from the client device, and provides the device data to the service application. Subsequent to provision of the device data to the service application, the device controller relays the control command to the client device, and the client device executes the command.

20 Claims, 4 Drawing Sheets

(56) References Cited

U.S. PATENT DOCUMENTS

| | | |
|---|---|---|
| 8,650,283 B1 | 2/2014 | Chang et al. |
| 8,745,746 B1 | 6/2014 | Jain |
| 2002/0045437 A1 | 4/2002 | Kesler |
| 2004/0030880 A1 | 2/2004 | Kitagawa |
| 2005/0125553 A1 | 6/2005 | Wu et al. |
| 2006/0080656 A1 | 4/2006 | Cain et al. |
| 2006/0200856 A1 | 9/2006 | Salowey et al. |
| 2007/0006309 A1 | 1/2007 | Herbert et al. |
| 2007/0019236 A1 | 1/2007 | Sando |
| 2007/0050762 A1 | 3/2007 | Chen et al. |
| 2007/0226343 A1 | 9/2007 | Bishop |
| 2007/0265830 A1 | 11/2007 | Sidhu et al. |
| 2008/0005733 A1 | 1/2008 | Ramachandran et al. |
| 2008/0140714 A1 | 6/2008 | Rhoads et al. |
| 2008/0304421 A1 | 12/2008 | Ramasubramanian et al. |
| 2009/0044056 A1 | 2/2009 | Itoh |
| 2009/0144395 A1 | 6/2009 | Desalvo |
| 2009/0177806 A1 | 7/2009 | Nishikawa |
| 2009/0199176 A1 | 8/2009 | Nath et al. |
| 2009/0282128 A1 | 11/2009 | Le et al. |
| 2010/0082792 A1 | 4/2010 | Johnson |
| 2010/0130178 A1* | 5/2010 | Bennett .................. H04L 63/30 455/414.1 |
| 2010/0228819 A1 | 9/2010 | Wei |
| 2010/0235321 A1 | 9/2010 | Shukla et al. |
| 2011/0185303 A1 | 7/2011 | Katagi et al. |
| 2011/0238988 A1 | 9/2011 | Tanaka et al. |
| 2011/0264730 A1 | 10/2011 | Dattagupta et al. |
| 2012/0099024 A1 | 4/2012 | Ryu et al. |
| 2012/0167185 A1 | 6/2012 | Menezes et al. |
| 2012/0191769 A1 | 7/2012 | Lovinger et al. |
| 2012/0206760 A1 | 8/2012 | Asahara |
| 2012/0207079 A1* | 8/2012 | Wang .................... H04W 28/26 370/315 |
| 2012/0216259 A1 | 8/2012 | Okamoto et al. |
| 2013/0007190 A1 | 1/2013 | Kumar et al. |
| 2013/0077664 A1 | 3/2013 | Lee |
| 2013/0090939 A1 | 4/2013 | Robinson et al. |
| 2013/0125107 A1 | 5/2013 | Bandakka et al. |
| 2013/0191929 A1 | 7/2013 | Yin et al. |
| 2013/0198730 A1 | 8/2013 | Munireddy et al. |
| 2013/0261821 A1 | 10/2013 | Lu et al. |
| 2014/0082117 A1* | 3/2014 | Unhale ................. H04L 67/306 709/208 |
| 2014/0133656 A1 | 5/2014 | Wurster et al. |
| 2014/0237130 A1 | 8/2014 | Chan |
| 2014/0237131 A1 | 8/2014 | Chan |
| 2015/0058834 A1 | 2/2015 | Chan |
| 2015/0067667 A1 | 3/2015 | Chan |
| 2015/0319143 A1* | 11/2015 | Kim .................... G06F 21/6281 713/171 |

OTHER PUBLICATIONS

International Search Report and Written Opinion—PCT/US2014/030336—ISA/EPO—Oct. 23, 2014.

* cited by examiner

PROVIDING NEAR REAL-TIME DEVICE REPRESENTATION TO APPLICATIONS AND SERVICES

RELATED APPLICATIONS

This application claims the benefit of U.S. (U.S.) Patent Application No. 61/756,727, filed Jan. 25, 2013.

This application claims the benefit of U.S. Patent Application No. 61/756,748, filed Jan. 25, 2013.

This application claims the benefit of U.S. Patent Application No. 61/756,785, filed Jan. 25, 2013.

This application claims the benefit of U.S. Patent Application No. 61/798,347, filed Mar. 15, 2013.

This application claims the benefit of U.S. Patent Application No. 61/794,977, filed Mar. 15, 2013.

TECHNICAL FIELD

The embodiments herein relate to processing systems and, more particularly, to methods and apparatus to uniquely identify and communicate with client devices to provide care service regardless of location of the client device.

BACKGROUND

Systems and methods are needed to provide real-time or near real-time device representation of client devices to applications and services, regardless of location of the client devices.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

Systems and methods are described comprising receiving at a platform device data of a client device and storing the device data in a data block allocated to the client device. A control command for the client device is received from a service application, and the control command is accepted at a device controller. The device controller accepts the control command on behalf of the client device. The device controller, in response to the control command, retrieves the device data from the data block instead of receiving the device data directly from the client device, and provides the device data to the service application. Subsequent to provision of the device data to the service application, the device controller relays the control command to the client device, and the client device executes the command.

One or more of a system, device or apparatus, and method is described in which a unique identification is issued to each device. The unique identification, which is referred to herein as innodevID, is issued to each device that is brought to a mobile device management service of a service provider. The mobile device management service of an embodiment is referred to herein as a care service or, alternatively, an activeCare service. Communication with the device is enabled using a pre-specified address convention. Communication with the device in an embodiment uses but is not limited to the following address convention: innodevID@service_domain/serviceID. This address convention is used for example to send and receive real-time device control command or device information to and from the device and the activeCare service platform. The serviceID portion or component of the address convention is an identification number that is used to represent the logical active session ongoing between the device and the servicing agent during the service call.

Although the detailed description herein contains many specifics for the purposes of illustration, anyone of ordinary skill in the art will appreciate that many variations and alterations to the following details are within the scope of the embodiments described herein. Thus, the following illustrative embodiments are set forth without any loss of generality to, and without imposing limitations upon, the claimed invention.

Figure 1:
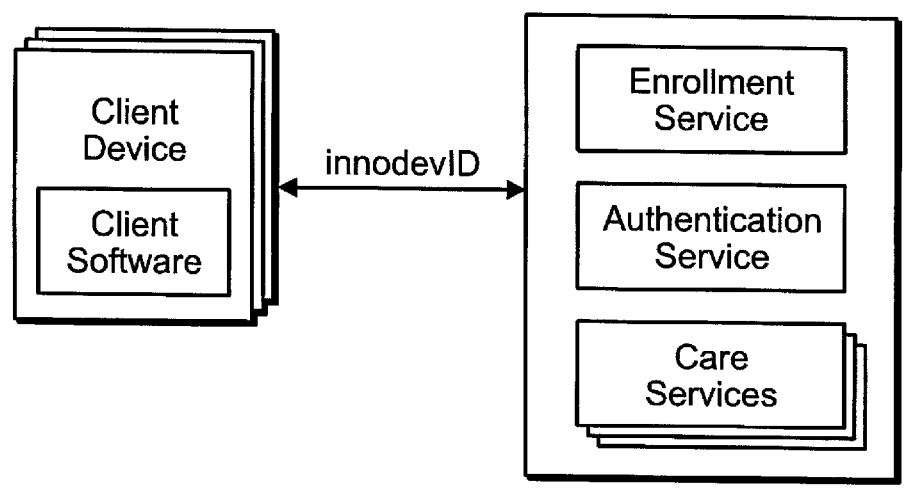
FIG. 1 is a block diagram of a device management service, under an embodiment.

FIG. 1 is a block diagram of a device management service, under an embodiment. The device management service includes a platform, system and/or components comprising one or more of an enrollment service, authentication service and care services or care applications, all of which are described in detail herein. The device management service communicates with one or more client devices, each hosting client software. Communication between the device management service and the client devices involves the use of a unique identification, referred to herein as innodevID, as described in detail herein.

Figure 2:
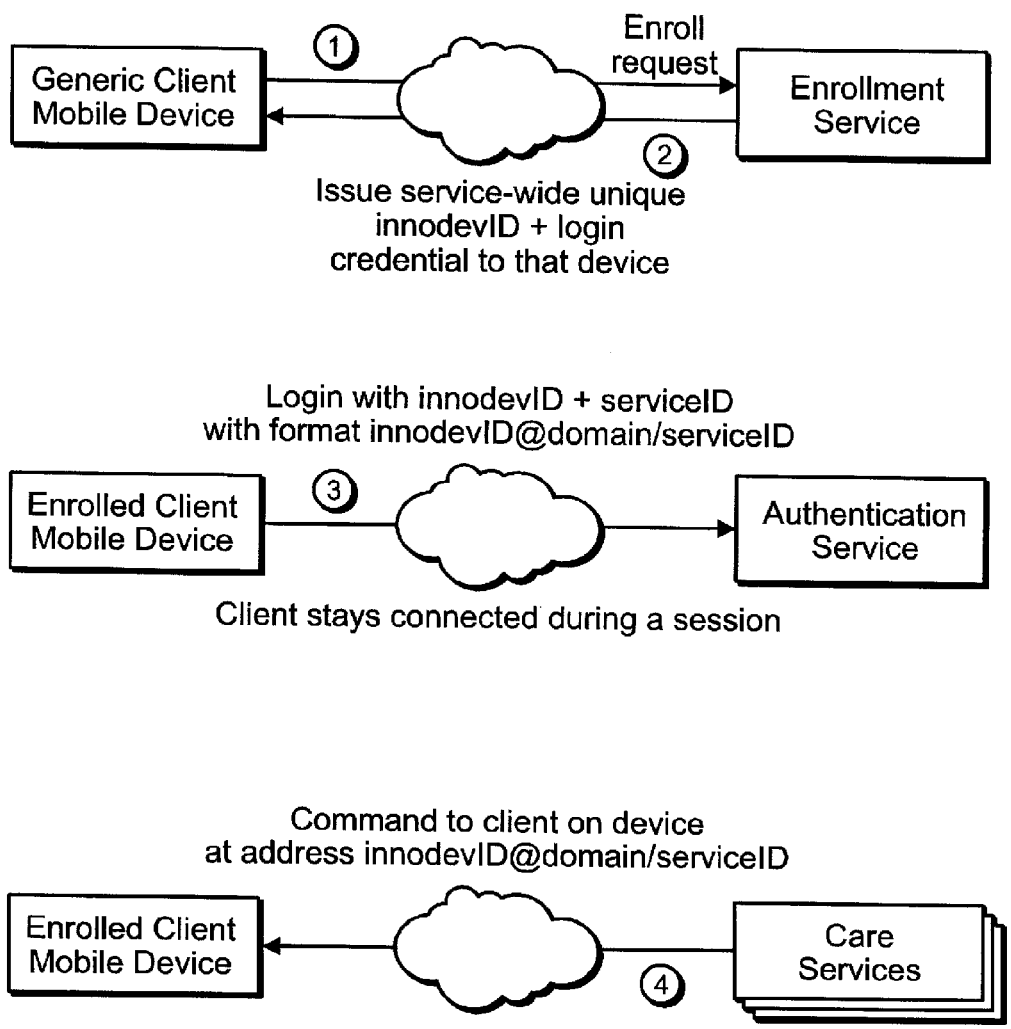
FIG. 2 is a flow diagram for provisioning a client device and assigning a universal identification to the client device, under an embodiment.

FIG. 2 is a flow diagram for provisioning a client device and assigning a universal identification to the client device, under an embodiment. The universal identification assigned to the client device is used by care applications in management of the device, as described below. The client device includes any portable communication device having a wired and/or wireless communication interface by which the device interacts with one or more care applications in a local or remote environment, but is not so limited. The client device couples or connects to the care applications using a communication path that includes any medium for communicating among the computing systems including, but not limited to, wireless couplings and/or connections, wired couplings and/or connections, and hybrid wireless/wired couplings and/or connections.

The care services are provided by care applications that include but are not limited to applications hosted on one or more local desktop computers and/or server computers. Further, the care applications include one or more services including but not limited to public services, private services, and/or personal services deploying as cloud or non-cloud based services.

The client device of an embodiment includes one or more applications or modules, referred to herein as client software or software, downloaded from a software distribution service via a communication path and installed on the client device. The client software is loaded onto the device via a user-initiated download from a software distribution program, for example. Alternatively, the client software is loaded onto the device via an automatic download, but the embodiment is not so limited.

As yet another alternative, the client software can be loaded onto the device using a hybrid procedure that includes an automatic procedure combined with some user action. In but one example of a hybrid procedure, the care services send to the client device an electronic message (e.g., electronic mail, SMS, etc.) that includes a link or icon for use in downloading the client software. Following receipt of the electronic message, the user clicks or selects the link or icon in the message and this user action initiates the download of the client software.

Once loaded onto a host client device, the client software of an embodiment is instructed to initiate an enrollment request to a care application but is not so limited.

Alternatively, the client software self-recognizes its pre-enrollment state and in response initiates an enrollment request to a care application.

The enrollment request of an embodiment includes a set of information including but not limited to a pre-arranged enrollment request key and client device-specific information. The device information includes one or more of mobile device identification number, manufacturer serial number, Ethernet MAC address, carrier information, and additional information describing the state of the client device. The information of the enrollment request is sent to the care enrollment service. The care enrollment service upon receiving an enrollment request uses the client device information included in the enrollment request along with information of a knowledge base to which it is coupled to determine if the client device has previously been enrolled.

If a determination is made that the requesting client device has not been enrolled, a unique device identification number, referred to herein as innodevID, is generated by the care application in the application domain. Once generated, the innodevID is issued and assigned to the particular requesting client device. In the case where the enrollment service is hosted or running in multiple locations, such as regional data centers, the unique device identification number includes additional information identifying the location generating the unique device identification number. If a determination is made that the requesting client device has previously been enrolled, then the unique device identification number previously issued during the enrollment is again returned to the requesting client device.

The care enrollment service responds to the enrollment request with the assigned unique device identification number along with an encrypted login credential. The login credential is used for any service request to the care application. Upon receipt of the enrollment response from the care enrollment service, the client software stores the unique device identification and login credential for subsequent use in future service requests. In further response to receipt of the enrollment response, the client software couples or connects to the care application using the unique device identification and the login credential over a secure communication channel such as transport layer security (TLS) and secured sockets layer (SSL), but is not so limited.

Once the requesting client device receives the unique device identification number from the device management service, the care application and its modules or components communicate with the client device using this unique device identification. The unique device identification of an embodiment is in the form of innodevID@domain/serviceID.

The service ID component of the device identification, referred to herein as the service identification notation, is a string of characters and/or numbers assigned to identify an active session between the client device and the care application. As such, the care application and its modules communicate with the client device using this unique device identification regardless of a current location of the client device and regardless of a location of the application modules. Furthermore, the established communication session or path remains connected from the logical perspective of both the client software and the care application until such time as one of the client software and the care application terminate the application session and disconnect the coupling or connection. For example, the client device can connect to the care service via a mobile data network at the start of a session; and during the session the client device switches and connects to a WiFi network. Regardless of the change in the connection during the session, the care application continues to address the client software using the assigned unique client device identifier.

Figure 3:
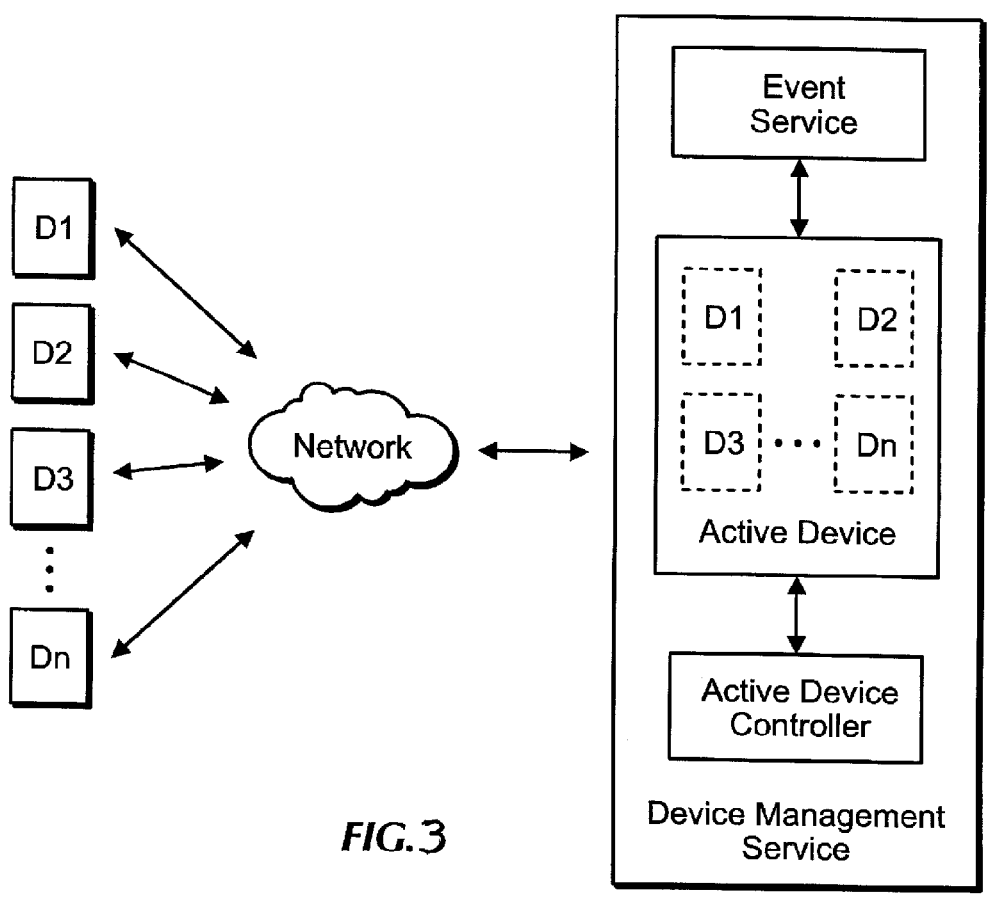
FIG. 3 is a block diagram of a system providing near real-time device representation of client devices to applications and services, under an embodiment.
Figure 4:
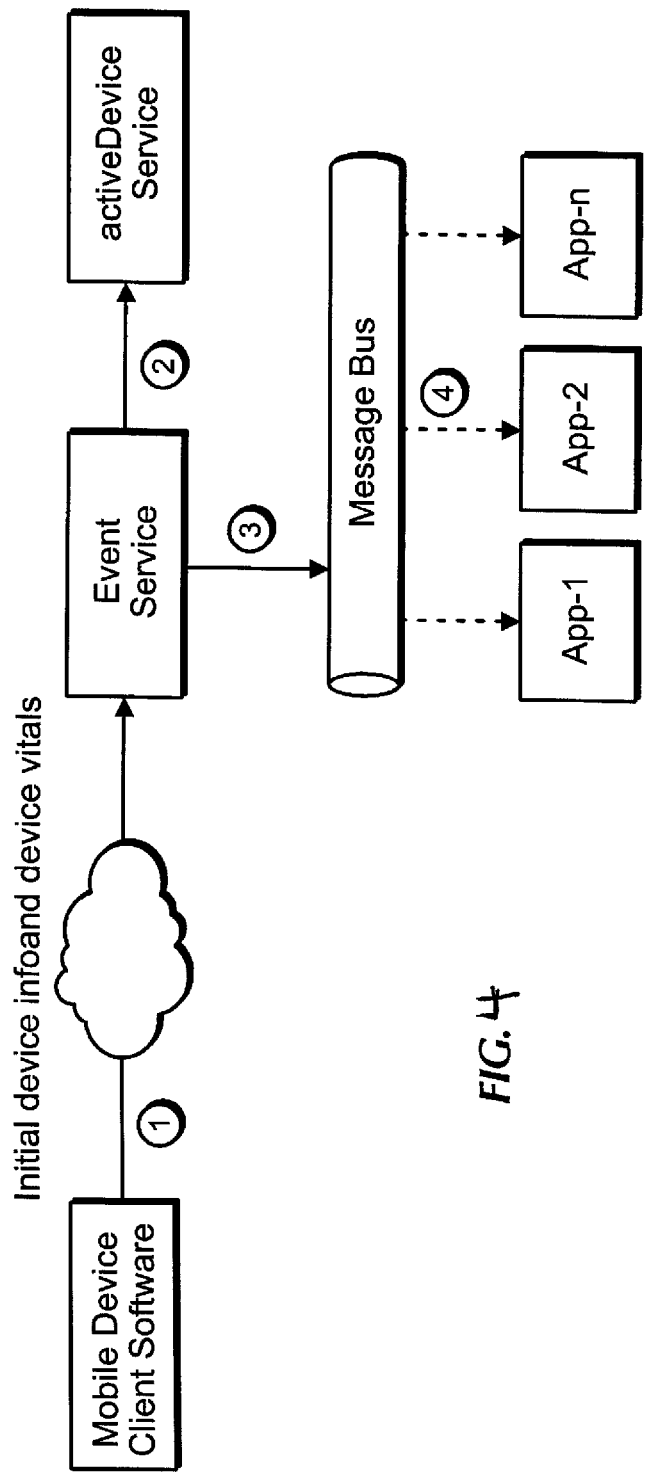
FIG. 4 is a block diagram for providing near real-time device representation of a client device to applications and services, under an embodiment.

FIG. 3 is a block diagram of a system providing near real-time device representation of client devices to applications and services, under an embodiment. FIG. 4 is a block diagram for providing near real-time device representation of a client device to applications and services, under an embodiment. The client devices and client software of an embodiment are coupled via a network infrastructure (e.g., mobile network) to the device management service. As described in detail herein, the device information and vitals of the client devices are sent to components of the care service of the device management service, and the care service software stores the device information and device vitals in a corresponding portion of a high performance data store referred to herein as the Active Device. The Active Device comprises a data storage portion or block corresponding to each device, and stores the device information and vitals of that device in the data storage block corresponding to the device. The Active Device is coupled to and under control of an active device controller. The care service provides a programmatic access interface to allow other software modules or applications to retrieve device information without having to wait for a synchronous response from the device at such time when the device may not immediately be available as a result of network connectivity issue (e.g., when the communication network is slow, unresponsive, etc.).

More particularly, the client devices and client software of an embodiment are coupled via the network infrastructure to the event service, and the event service is coupled to the Active Device. The event service is also coupled to a messaging bus. Further, care applications are coupled to the messaging bus.

The Active Device acts as a mediator during an active session between client devices and service agents via the activeCare service components. During an active session (e.g., service call), the Active Device comprises all near real-time device vitals of each client device in its in-memory repository such that all vitals of any device can be retrieved instantaneously or nearly instantaneously, thereby eliminating or nearly eliminating any wait time. Additionally, the service agent and activeCare service components are not required to know or deal with the actual client device via a typical network coupling or connection.

Generally, when the service agent issues a device control command during a service call, the Active Device Controller, a companion software component coupled to the Active Device, accepts the control command on behalf of the target client device.

The service agent issuing control command immediately receives a command receipt acknowledgement back from the controller as if the acknowledgement was sent directly from the target client device. At some time subsequent to receipt of the control command from the service agent, the Active Device Controller uses the respective communication protocol corresponding to the target client device to relay the control command to the target client device. The result of the command execution on the device reflects through the near real-time device vital information update to the Active Device.

As described in detail herein, once loaded onto a host client device, the client software of an embodiment is invoked and initiates an enrollment request to a care application of the device management service, but is not so limited. The enrollment request includes a set of information comprising client device-specific information. The device information includes one or more of mobile device identification number, device manufacturer, manufacturer serial number, model number, International Mobile Subscriber Identity (IMSI), International Mobile Station Equipment Identity (IMEI), Mobile Subscriber Integrated Services Digital Network-Number (MSISDN), Ethernet Media Access Control (MAC) address, carrier information, and additional information describing the state of the client device, for example. The device information of an embodiment also includes device vitals that include one or more of firmware version, battery and signal related status, data network information, and other information or data describing a current state of the client device to name a few.

The device information and vitals are sent to the care service, and the care service software stores the device information and device vitals in a high performance data store referred to herein as the Active Device. The care service provides a programmatic access interface to allow other software modules or applications to retrieve device information without having to wait for a synchronous response from the device at such time when the device may not immediately be available as a result of network connectivity issue (e.g., when the communication network is slow, unresponsive, etc.).

During an active session (e.g., service call), the Active Device comprises all near real-time device vitals of each client device in its in-memory repository such that all vitals of any device can be retrieved instantaneously or nearly instantaneously by a service agent, thereby eliminating or nearly eliminating any wait time. Additionally, the service agent and activeCare service components are not required to know or deal with the actual client device via a typical network coupling or connection. Thus, the care applications retrieve device status directly from the active device service with a consistent predictable response time without waiting for the synchronous response from devices when the communication link is slow or unresponsive. The information stored in the active device is marked outdated when the client and server session is over.

Generally, when the service agent issues a device control command during a service call, the Active Device Controller, a companion software component coupled to the Active Device, accepts the control command on behalf of the target client device. The service agent issuing control command immediately receives a command receipt acknowledgement back from the controller as if the acknowledgement was sent directly from the target client device. At some time subsequent to receipt of the control command from the service agent, the Active Device Controller uses the respective communication protocol corresponding to the target client device to relay the control command to the target client device. The result of the command execution on the device reflects through the near real-time device vital information update to the Active Device.

The client software updates the device information and vitals using an update notification to the event service software module, for example, simultaneous with or subsequent to execution of a control command at the client device. The update notification and update information of an embodiment are sent by the client device when changes in respective data or data values exceed a pre-specified threshold value.

Alternatively, the update notification and update information can be sent periodically by the client device, or in response to a pre-specified trigger event. The update notification is conveyed to the event service module of the care server software in the form of software events to update the active device information. After the updating, the event service module broadcasts information of the change event to its internal publish/subscribe messaging bus. Any software module to which the changes to the device vitals are relevant is notified of the change event.

As described above, computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The device management service can be a component of a single system, multiple systems, and/or geographically separate systems. The device management service can also be a subcomponent or subsystem of a single system, multiple systems, and/or geographically separate systems. The device management service can be coupled to one or more other components (not shown) of a host system or a system coupled to the host system.

One or more components of the device management service and/or a corresponding system or application to which the device management service is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes the device management service can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages. Aspects of the device management service and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the device management service and corresponding systems and methods include: microcontrollers with memory (such as electronically erasable programmable read only memory (EEPROM)), embedded microprocessors, firmware, software, etc. Furthermore, aspects of the device management service and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the device management service and corresponding systems and methods is not intended to be exhaustive or to limit the systems and methods to the precise forms disclosed. While specific embodiments of, and examples for, the device management service and corresponding systems and methods are described herein for illustrative purposes, various equivalent modifications are possible within the scope of the systems and methods, as those skilled in the relevant art will recognize. The teachings of the device management service and corresponding systems and methods provided herein can be applied to other systems and methods, not only for the systems and methods described above.

The elements and acts of the various embodiments described above can be combined to provide further embodiments. These and other changes can be made to the device management service and corresponding systems and methods in light of the above detailed description.

What is claimed is:

1. A method comprising:
    enrolling a client device with a platform by:
        receiving at the platform an enrollment request from a client application of the client device, wherein the enrollment request comprises a request key and device data of the client device;
        storing the device data in a data block allocated to the client device;
        generating a device identification, issuing the device identification to the client device, and generating a response to the client device that is a response to the enrollment request and includes the device identification; and
        controlling sessions between the client device and the platform using the device identification, wherein the sessions each use an address convention comprising the device identification, a service identification component that represents a logical active session between the client device and the platform, and a service domain identification component, the address convention comprising a form including
    device identification@service domain/service identification;
    receiving from a service application a control command for the client device;
    accepting the control command on behalf of the client device;
    in response to the control command, retrieving the device data from the data block instead of receiving the device data directly from the client device, and providing the device data to the service application; and
    relaying the control command to the client device for execution by the client device.

2. The method of claim 1, wherein the device data comprises at least one of a device identification number, a device manufacturer, a manufacturer serial number, a model number, International Mobile Subscriber Identity (IMSI), International Mobile Station Equipment Identity (IMEI), Mobile Subscriber Integrated Services Digital Network-Number (MSISDN), a media access control (MAC) address, carrier data of a carrier corresponding to the client device, and state data of the client device.

3. The method of claim 1, wherein the platform comprises a plurality of data blocks, wherein the plurality of data blocks correspond to a plurality of client devices, wherein each data block corresponds to a client device, wherein the plurality of data blocks include the data block and the plurality of client devices include the client device.

4. The method of claim 1, further comprising:
in response to accepting the control command, issuing a command receipt acknowledgement to the service application.

5. The method of claim 1, further comprising:
receiving at the platform updated device data of the client device, wherein the updated device data is received in an update notification generated periodically or in response to a pre-specified trigger event.

6. The method of claim 1, wherein the platform is a care service platform, wherein the care service platform comprises a plurality of service applications that provide device management services to a plurality of client devices, wherein the plurality of service applications include the service application.

7. The method of claim 1, further comprising:
initiating the enrollment request in a client application hosted on the client device, wherein the initiating comprises one of instructing the client application to initiate the enrollment request, and automatically initiating the enrollment request at the client application when the client application self-recognizes a pre-enrollment state.

8. The method of claim 1, wherein the device identification includes location data of a location from which the device identification is issued.

9. The method of claim 1, wherein the response to the client device includes an encrypted login credential used for a service request to the service application that provides device management services to the client device.

10. The method of claim 1, wherein sessions established between the platform and the client device remain connected logically until one of the platform and the client device terminate the session, regardless of connection point location of the client device.

11. A non-transitory computer-readable storage medium storing instructions that, when executed by one or more processors of a platform, cause the platform to perform operations comprising:
enrolling a client device with the platform by:
receiving at the platform an enrollment request from a client application of the client device, wherein the enrollment request comprises a request key and device data of the client device;
storing the device data in a data block allocated to the client device;
generating a device identification, issuing the device identification to the client device, and generating a response to the client device that is a response to the enrollment request and includes the device identification; and
controlling sessions between the client device and the platform using the device identification, wherein the sessions each use an address convention comprising the device identification, a service identification component that represents a logical active session between the client device and the platform, and a service domain identification component, the address convention comprising a form including device_identification@service_domain/service_identification;
receiving from a service application a control command for the client device;
accepting the control command on behalf of the client device;
in response to the control command, retrieving the device data from the data block instead of receiving the device data directly from the client device, and providing the device data to the service application; and
relaying the control command to the client device for execution by the client device.

12. The non-transitory computer-readable storage medium of claim 11, wherein the device data comprises at least one of a device identification number, a device manufacturer, a manufacturer serial number, a model number, International Mobile Subscriber Identity (IMSI), International Mobile Station Equipment Identity (IMEI), Mobile Subscriber Integrated Services Digital Network-Number (MSISDN), a media access control (MAC) address, carrier data of a carrier corresponding to the client device, and state data of the client device.

13. The non-transitory computer-readable storage medium of claim 11, wherein the platform comprises a plurality of data blocks, wherein the plurality of data blocks correspond to a plurality of client devices, wherein each data block corresponds to a client device, wherein the plurality of data blocks include the data block and the plurality of client devices include the client device.

14. The non-transitory computer-readable storage medium of claim 11, wherein execution of the instructions causes the platform to perform operations further comprising:
in response to accepting the control command, issuing a command receipt acknowledgement to the service application.

15. The non-transitory computer-readable storage medium of claim 11, wherein execution of the instructions causes the platform to perform operations further comprising:
receiving, in an update notification, updated device data of the client device, the update notification generated periodically or in response to a pre-specified trigger event.

16. The non-transitory computer-readable storage medium of claim 11, wherein the platform is a care service platform, wherein the care service platform comprises a plurality of service applications that provide device management services to a plurality of client devices, wherein the plurality of service applications include the service application.

17. The non-transitory computer-readable storage medium of claim 11, wherein the device identification includes location data of a location from which the device identification is issued.

18. The non-transitory computer-readable storage medium of claim 11, wherein the response to the client device includes an encrypted login credential used for a service request to the service application that provides device management services to the client device.

19. The non-transitory computer-readable storage medium of claim 11, wherein sessions established between the platform and the client device remain connected logically until one of the platform and the client device terminate the session, regardless of connection point location of the client device.

20. A platform for relaying commands to a client device, the platform comprising:
 means for enrolling the client device with the platform by:
  receiving at the platform an enrollment request from a client application of the client device, wherein the enrollment request comprises a request key and device data of the client device;
  storing the device data in a data block allocated to the client device;
  generating a device identification;
  issuing the device identification to the client device;
  generating a response to the client device that is a response to the enrollment request and includes the device identification; and
  controlling sessions between the client device and the platform using the device identification, wherein the sessions each use an address convention comprising the device identification, a service identification component that represents a logical active session between the client device and the platform, and a service domain identification component, the address convention comprising a form including device_identification@service_domain/service_identification;
 means for receiving from a service application a control command for the client device;
 means for accepting the control command on behalf of the client device;
 means for, in response to the control command, retrieving the device data from the data block instead of receiving the device data directly from the client device, and providing the device data to the service application; and
 means for relaying the control command to the client device for execution by the client device.

* * * * *